United States Patent [19]

Smith

[11] Patent Number: 5,297,379
[45] Date of Patent: Mar. 29, 1994

[54] WALK-BEHIND LAWN MOWER WITH FRONT WHEEL STEERING

[75] Inventor: Leary W. Smith, Chamblee, Ga.

[73] Assignee: Fuqua Industries, McDonough, Ga.

[21] Appl. No.: 848,731

[22] Filed: Mar. 9, 1992

[51] Int. Cl.⁵ .................... A01D 34/64; A01D 34/68; A01D 34/82
[52] U.S. Cl. ...................................... 56/11.8; 56/16.7; 56/17.5; 180/19.1; 20/267; 20/268
[58] Field of Search .................. 56/16.7, 16.9, 17.5, 56/10.8, 11.3, 11.4, 11.5, 11.7, 11.8; 180/19.3, 19.2, 19.1; 280/267, 268, 269

[56] References Cited

U.S. PATENT DOCUMENTS

| | | |
|---|---|---|
| 1,477,398 | 12/1923 | Valentine et al. |
| 2,815,633 | 12/1957 | Meyer. |
| 3,029,887 | 4/1962 | Schantz. |
| 3,196,971 | 7/1965 | Schantz. |
| 3,382,653 | 5/1968 | Buigne. |
| 3,780,504 | 12/1973 | Haseloff. |
| 3,871,464 | 3/1975 | Eden. |
| 4,024,695 | 5/1977 | Haseloff. |
| 4,212,141 | 7/1980 | Miyazawa et al. ............... 56/11.8 |
| 4,335,566 | 6/1982 | Hurd ..................... 56/11.8 |
| 4,538,401 | 9/1985 | Takamizawa et al. ............. 56/11.8 |
| 4,558,558 | 12/1985 | Horner, Jr. et al. .......... 180/19.3 X |
| 4,896,487 | 1/1990 | Hikishima et al. . |
| 5,020,308 | 6/1991 | Braun et al. ................... 56/11.5 X |
| 5,146,735 | 9/1992 | McDonner ................. 180/19.3 X |

Primary Examiner—Stephen J. Novosad
Attorney, Agent, or Firm—Jones & Askew

[57] ABSTRACT

A walk-behind power driven lawn mower having a front wheel steering system including a control mounted on the mower handle and a linkage system interconnecting the control and the front wheels of the mower so that in operation the mower may be steered to the right or left by the operator as the grass cutting operation proceeds. The control includes a lever for controlling the drive transmission to the rear wheels. Also disclosed is a locking tab attached to a pivoting wheel drive actuation handle which lockingly engages an operator presence bar in engagement when said wheel drive actuation handle is in engagement.

14 Claims, 3 Drawing Sheets

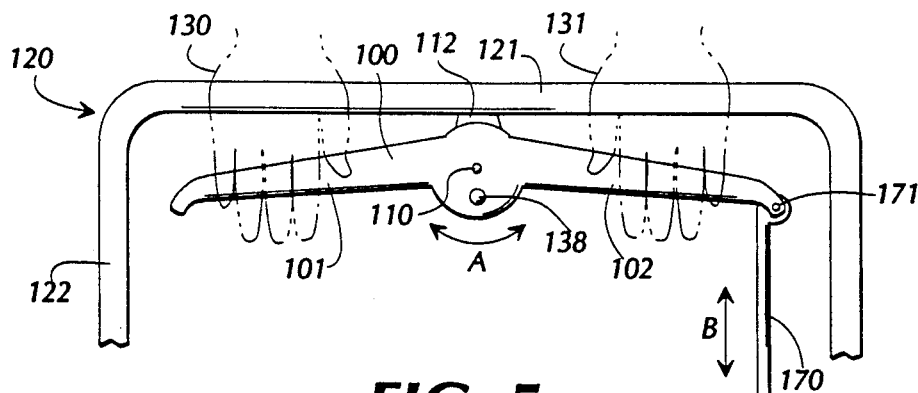
FIG. 5
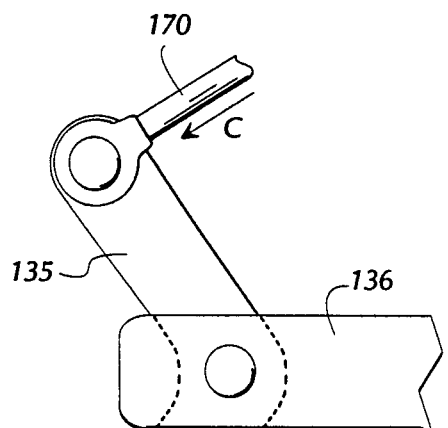
FIG. 6
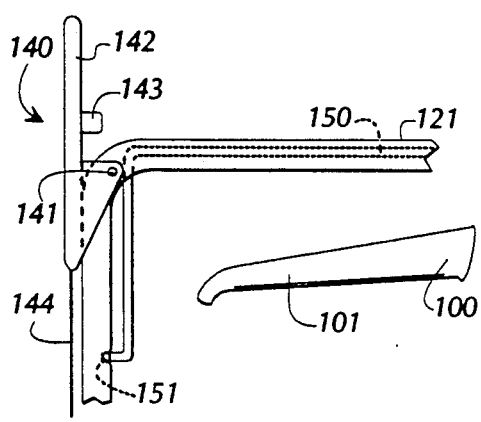 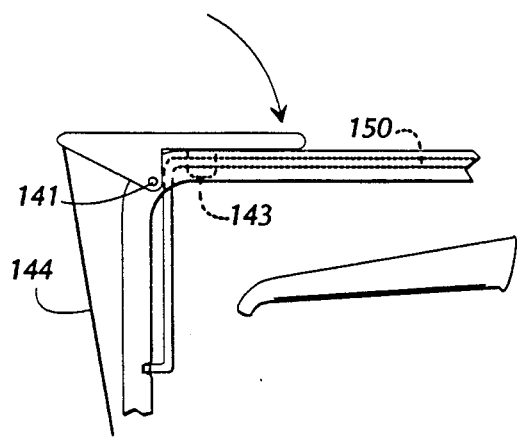
FIG. 7        FIG. 8

WALK-BEHIND LAWN MOWER WITH FRONT WHEEL STEERING

BACKGROUND OF INVENTION

The present invention relates to walk-behind lawn mowers, such as power driven walk-behind lawn mowers, and more particularly to a novel walk-behind lawn mower whose front wheels may be steered by the operator during a cutting operation.

It is known that in walk-behind lawn mowers having no operable steering mechanism that the machine is designed to follow a straight course when no force is applied by the operator to the control handle. In order to steer the mower considerable force must be exerted by the operator to the control handle to guide the mower in the intended direction of travel. For example, to turn the machine from one direction of travel to another the operator must exert sufficient force downward and sideward on the control handle to skew the front end around into the intended direction of travel. Further, at every correction of course the aforesaid action must be repeated. The force required to turn the machine varies, dependent on the distribution of weight on the rear wheels and handle length and position of the particular lawn mower but will average between approximately 18% and 30% of the total weight of the machine.

In the prior art, it is known to provide a steering system for the rear wheel or wheels of a walk-behind lawn mower. This is illustrated for example in U.S. patents to Schantz U.S. Pat. Nos. 3,029,887 and 3,196,971 and Haseloff U.S. Pat. Nos. 3,780,504 and 4,024,695. However, such steering systems are limited in their ability to maneuver the mower to turn away from a closely adjacent fence, wall or ditch without striking the latter.

OBJECTS OF THE PRESENT INVENTION

It is an object of the present invention to provide a novel and improved walk-behind lawn mower having a steering system for steering the front wheels of the mower during a cutting operation. Included herein is a provision of such a lawn mower having a novel linkage and control system through which the operator may turn the front wheels of the lawn mower during a cutting operation.

It is a further object of the present invention to provide a novel walk-behind lawn mower requiring considerably less operator effort for guidance control, thereby reducing operator fatigue to a minimum during the cutting operation.

A further object of the present invention is to provide a novel steering system which may be applied to conventional walk-behind lawn mowers including power driven lawn mowers without any substantial modification of the basic design of the lawn mower and without sacrificing safety in the operation of the lawn mower.

A further object of the present invention is to provide a walk-behind lawn mower having steerable front wheels which may be operated through a control mounted on the handle bar of the lawn mower to be easily manipulated by the operator during a cutting operation.

A still further object of the present invention is to provide a walk-behind lawn mower having a pair of steerable front wheels and a pair of rear wheels which are powered to drive the lawn mower.

SUMMARY OF INVENTION

In its preferred embodiment, the present invention includes a walk-behind lawn mower having a pair of front wheels mounted at the front of the blade housing for movement in a horizontal plane about generally vertical axes. A linkage system interconnects the front wheels to each other and to a control mounted on the handle bar of the mower so that during operation, the front wheels may be turned either to the left or the right as desired by the operator and as the cutting operation proceeds. Additionally, in the preferred embodiment, the mower is driven through rear wheels which are suitably driven.

DRAWINGS

Other objects and advantages will become apparent from the following detailed description of the invention taken in conjunction with the attached drawings in which:

FIG. 5 is a view of a portion of a handle configuration of a second lawn mower embodiment, as one would view the handle if standing in front of the mower and facing the operator. The features such as 140 on the handle shown in FIGS. 7 and 8 are not shown for simplicity.

FIG. 6 is a view of a linkage feature of the second lawn mower configuration.

FIGS. 7 and 8 are partial views of the handle shown in FIG. 5, illustrating the operation of a operator presence control and a pivoting drive actuation handle 140.

DETAILED DESCRIPTION

Figure 1:
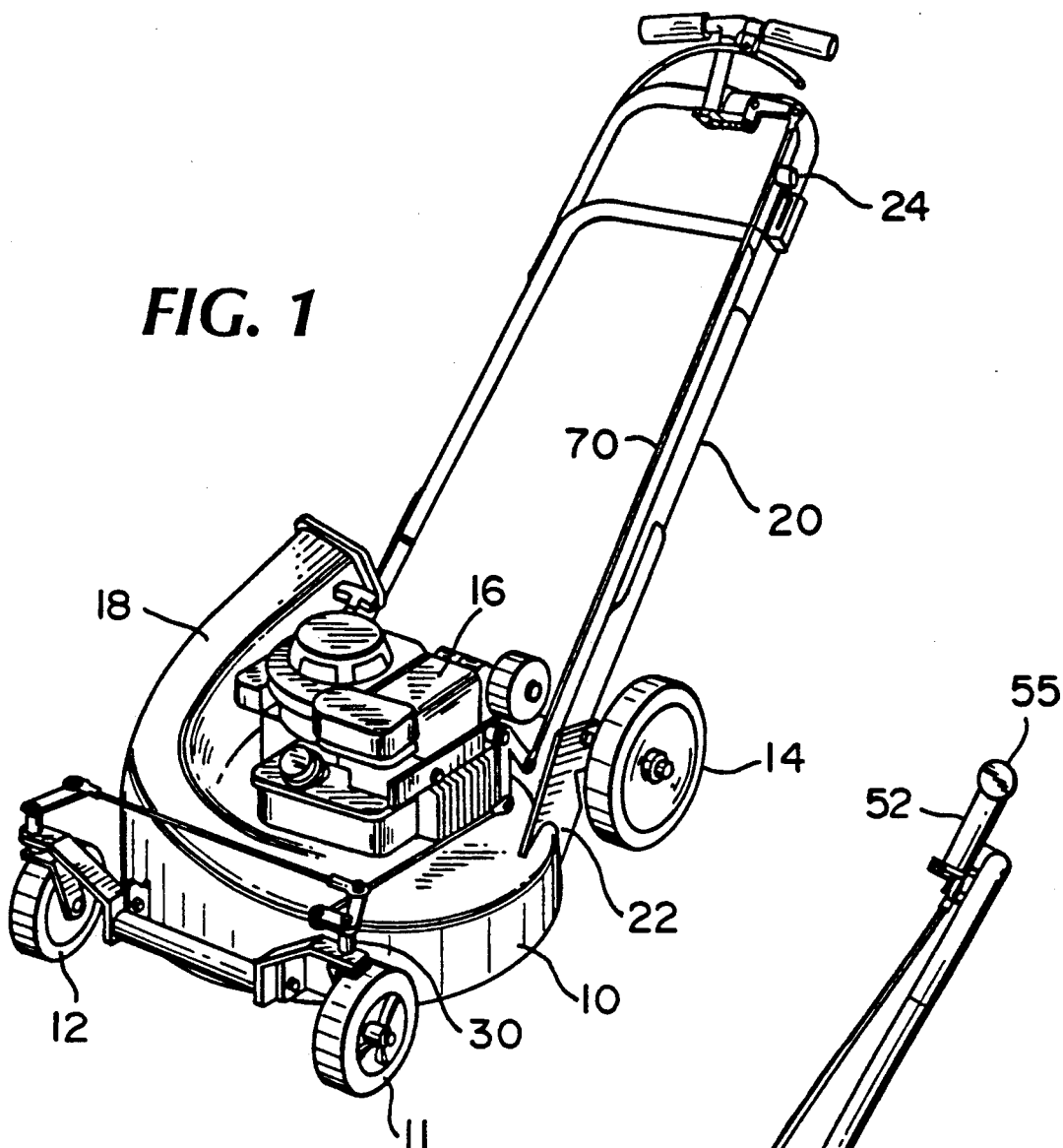
FIG. 1 is a perspective view of a first walk-behind lawn mower embodiment embodying the present invention.
Figure 2:
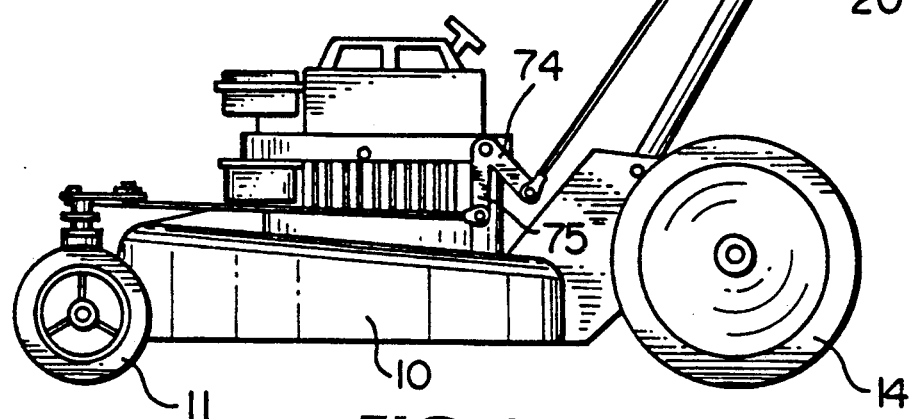
FIG. 2 is a side elevational view of the lawn mower of FIG. 1.

Referring now to the drawings in detail there is shown for illustrative purposes only, a walk-behind lawn mower constituting a preferred embodiment of the present invention. As shown in FIG. 1, the lawn mower includes a blade housing 10 in which is mounted for rotation about a vertical axis, a cutting blade (not shown) driven by an engine such as a gasoline engine generally designated 16 mounted on the central portion of the blade housing as is of course conventional. In the specific embodiment shown, the grass clippings are discharged from a chute 18 which is to be connected to a grass collector (not shown) mounted on the handle 20 of the mower. In another mode of the mower, chute 18 may be replaced by a side discharge chute for discharging grass clippings directly onto the ground without collection. For a more detailed description of the blade housing and discharge chutes, referenced may be had to U.S. Pat. No. 3,568,421 or a SNAPPER brand walk behind lawn mower; the disclosures of which are hereby incorporated by reference into the instant application.

The blade housing is supported on the ground by a pair of front wheels 11 and 12 and a pair of rear wheels 14. In the preferred embodiment, the rear wheels 14 are driven from a power take off from the engine 16 and through a transmission preferably a disc drive (not shown) operated by a control handle (not shown) mounted to the mower handle 20 adjacent to the throttle control 24 for the engine 16. Also a differential is provided on the rear wheel axle (not shown). The parts of the mower described above are conventional and well known and therefore need no further description. However, reference may be had to U.S. Pat. No. 3,529,482 for a more detailed description of these parts. The entire disclosure of this patent is hereby also incorporated by reference into the present application. In addition reference may be had to a SNAPPER brand self propelled walk-behind mower presently being marketed in the United States.

In accordance with the present invention, the front wheels 11 and 12 are mounted to be steerable to the left or right in a horizontal plane by the operator in order to steer the lawn mower housing 10 in use during a cutting operation. Thus wheels 11 and 12 are mounted on wheel brackets 28 provided with vertical axles or shafts 30 mounted for rotation about vertical axes relative to the blade housing 10. In the specific embodiment shown, the front of the blade housing is provided with a yoke support 34 adjustably fixed to the housing 10 by means of brackets 36 for cutting height adjustment. Arms 32 on the opposite ends of yoke support 34 serve to mount shafts 30 in generally vertical position.

In order to steer the front wheels 11 and 12 in unison they are interconnected by a rod 45, the opposite ends of which are pivoted by pins 46 and 47 to cranks 44 and 40 which are connected to shafts 30 to rotate the same upon rotation of the cranks 44 and 40. As will be described below, rotation of crank 40 is effected by the operator of the lawn mower through a control 50, 54, 55, and such rotation of crank 40 is transmitted by rod 45 to crank 44 such that front wheels 11 and 12 are steered in unison.

Figure 3:
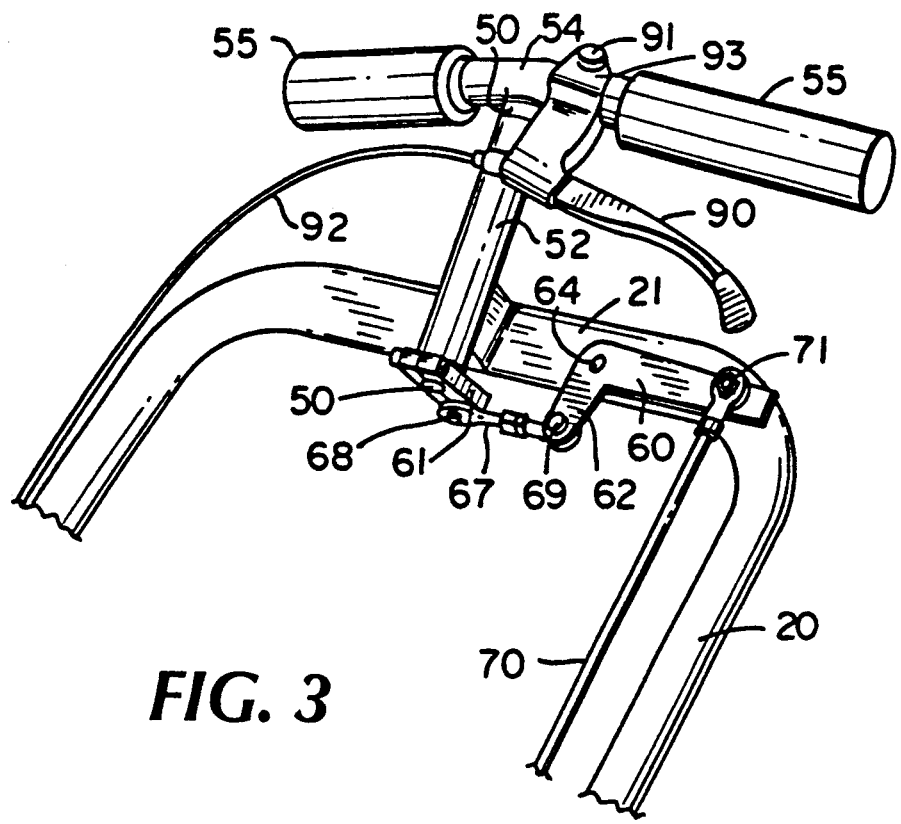
FIG. 3 is an enlarged, fragmental, perspective view of an upper portion of the handle bar of the mower of FIG. 1 showing a portion or the control and linkage system for steering the mower.

Referring to FIG. 3, the steering control includes a shaft or spindle 50 mounted for rotation about its own longitudinal axis in a tubular housing 52 fixed to the handle cross bar portion 21 at the mid-point thereof so that the spindle extends generally in the longitudinal direction for the mower but at an angle to the horizontal generally equal to the angle of the handle bar to the horizontal. Spindle 50 forms with a handle portion 54 to T-bar that is gripped by the operator for turning the spindle 50 to the right or left depending upon the desired direction of travel of the blade housing. Any suitable friction grips 55 are provided on handle 54 as shown in FIG. 3 of the preferred embodiment.

Rotation of handle 54 and spindle 50 is transmitted to the front wheel 11 by a linkage system including at its upper end, an elongated rod 70 extending generally along the handle 20 as best shown in FIG. 1 and having its upper end connected to spindle 50 by a crank 60, 62 pivoted at 64 to the handle cross bar 21. Crank 60, 62 is pivotally connected by pivot pin 69 to a link 67 which is pivotally connected by pivot pin 68 to a flange 61 fixed to the bottom of the spindle 50 below the spindle housing 52 as best shown in FIG. 3. In the specific embodiment shown, crank 60, 62 is in a plane generally parallel to the plane of handle bar portion 21.

Figure 4:
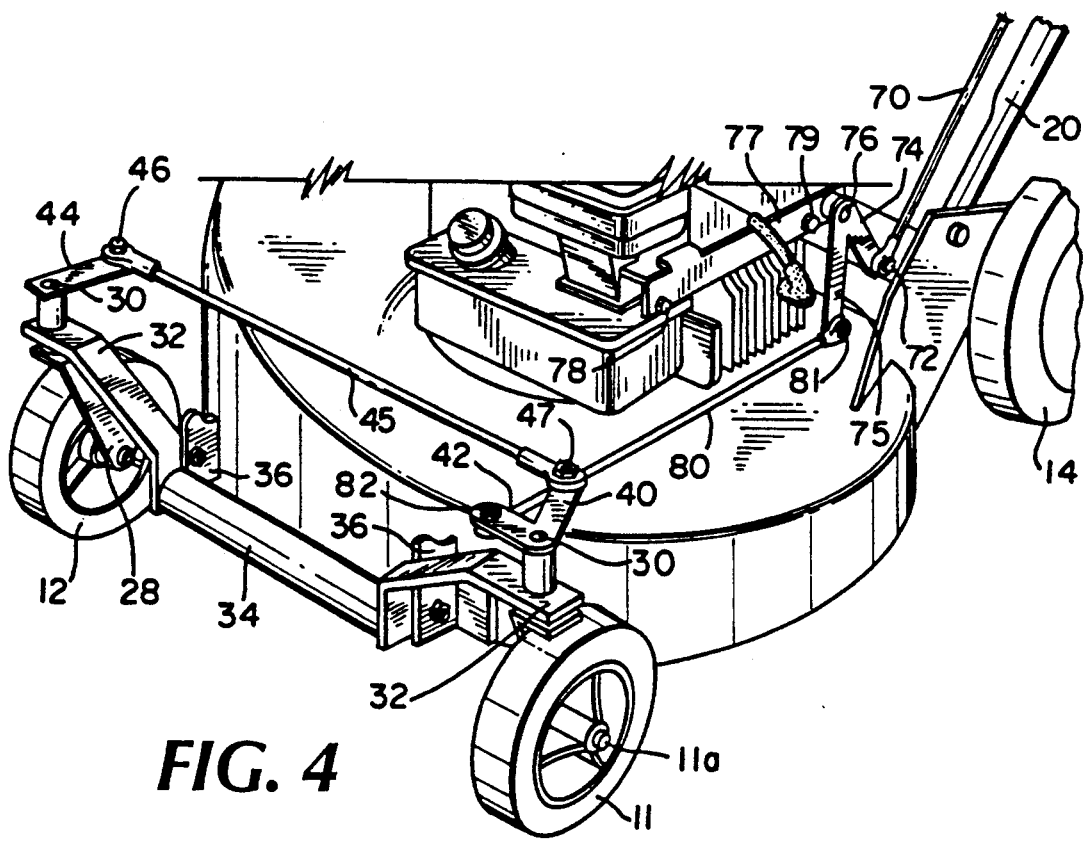
FIG. 4 is an enlarged, perspective view of the lawn mower of FIG. 1 showing the lower portion of the linkage system for steering the mower.

Referring now to FIG. 4, the lower end of rod 70 is pivotally connected to a crank 74 by a pivot pin 72. Crank 74, 75 is pivotally mounted in a vertical plane for movement about a generally horizontal axis by a pivot pin 76 (of course crank 74 may be mounted by other suitable means) mounted in a support bar 77 fixed by fasteners 78, 79 to the engine 16. Longitudinal movement of rod 70 will or course pivot crank 74, 75 about pivot pin 76.

The other arm 75 of crank 74, 75 is pivotally connected by a pivot pin 81 to a rod 80 which in turn is pivotally connected by pivot pin 82 to crank 40, 42 associated with front wheel 11. Longitudinal movement of rod 80 by crank 74, 75 will of course be transmitted to crank 40, 42 to rotate the latter together with shaft 30 and front wheel 11. This motion is simultaneously transmitted to the other front wheel 12 by rod 45 and crank 44 as described above.

In the preferred embodiment shown a lever control 90 for operating the drive transmission (not shown) to the rear wheels, is mounted to the steering control bar 54 as best shown in FIG. 3, to be easily held together with the steering control bar 54. In the specific embodiment shown, lever 90 is pivotally mounted in a bifurcated bracket 93 fixed about handle bar portion 54 by a bolt 91. Lever 90 is pivotable towards the handle bar 55 to operate a cable 92 connected to the drive transmission (not shown) to engage that unit during the grass cutting operation. When the lever 90 is released, the drive unit is disengaged and the forward motion will stop.

It will be seen from the above that the present invention provides a walk-behind mower which is steerable without any significant drag imposed by the front wheels since it is the front wheels that are being steered as the rear wheels are being driven. Moreover the present invention does not require modification of the drive and differential arrangement at the rear wheels to accommodate the steering mechanism since the latter is associated with the front wheels.

Referring now to FIGS. 5 and 6, a second preferred steering mechanism embodiment is illustrated, which is attached to a handle 120, and activates a rod 170. The rod 170 may be attached to a linkage assembly described in further detail below, such that movement of rod 170 such as shown by arrow "B" in FIG. 5 causes movement of an intermediate linkage assembly, and steering of the mower.

Referring now to FIG. 5, the mower handle 120 includes a handle bar 121 and two side bars 122. A mount member 112 is rigidly attached at approximately the center of the handle bar 121. A grip bar 100 is pivotably attached to the mount member 112 at approximately a point 110, and includes right and left finger grip handles 101, 102. Rod 170 is pivotably attached to the grip bar 100 at pivot point 171.

As may be understood, gripping of the handle bar 121 as well as the grip bar 100 by the operator's hands such as at 130, 131, allows the operator to perform a squeezing action to steer the mower, by squeezing the grip handles with the fingers and the handle bar with the palms. For example, by squeezing with the right hand at 130, the rod 170 is pushed forwardly steering the front wheels to the right, while the reverse is true if squeezed by the left hand at 131.

Referring now to FIG. 6, the forward end of the linkage 170 is itself attached to a crank 135, which is itself pivotably attached to a flange 136 fixed relative to the mower deck. Also pivotably attached to the crank 135 is a rod 80. As may be understood, forward movement of the rod such as shown by arrow "C" causes crank 135 to pivot, causing rod 80 to move rearwardly such as shown by arrow "D".

Reference is now made to FIG. 4. As may be seen, this figure illustrates a rod 80, which is connected to other cranks and linkages which allow rearward movement of the rod 80 to turn the front wheels of the mower to the right. Conversely, forward movement of the rod 80 turns the front wheels of the mower to the left.

It may therefore be understood that a second mower embodiment according to the present invention includes a second handle configuration such as shown in FIGS. 5 and 6, with a rod-linkage configuration including a rod 80. From that point on the "linkage chain" of the second mower embodiment, the linkage chain is as shown in FIG. 4, beginning with rod 80. Thus squeezing of the right finger grip handle 102 of the grip bar 100 causes pivoting about point 110 of the grip bar 100, which causes forward movement of the rod 170, which causes rearward movement of the rod 80. Rearward movement of the rod 80, as seen in reference to FIG. 4, causes rightward movement of both of the front wheels of the mower.

If it is desired to "lock" the grip bar 100 such that no steering is provided (such as to back up), a lock button 138 is provided which allows an operator to selectively lock the grip bar relative to the handle 120.

It may be seen that the above second embodiment includes advantages in that the operator may contact the handle bar 121 with the palms, which is a familiar action. However, should the mower need backing up, the lock button 138 may be engaged and a familiar backing-up action may be accomplished.

Referring now to FIGS. 7 and 8, a means for maintaining an operator presence bar 150 in place during power driving of a lawn mower is provided. As may be understood, in order to provide certain safety features, "operator presence" features are typically incorporated into lawnmowers. Such features require an operator to be present at a preferably safe location relative to the lawnmower; if the operator moves from that relatively safe position, he can no longer maintain the operator presence feature bar in engagement, thus resulting in the lawn mower either being turned off or the blade being disengaged. Operator presence bars such as 150 are typical.

In reference to FIG. 7, the pivotable U-shaped operator presence bar 150 is illustrated. A cable (not shown) extends from the operator presence bar, such that if an operator does not grip the operator presence bar 150 along with the handle bar 121 (typically with the thumbs), the operator presence bar will pivot downwardly about pivot points 151, resulting in the engine turning off or the blade being disengaged.

A pivoting drive actuation handle 140 is illustrated, which includes a palm bar 142, and a locking tab 143. The actuation handle 140 is pivotably attached relative to the handle 120 at pivot point 141. A connection cable 144 extends from the actuation handle 140 to a remote location (not shown), which allows a pull on the cable to engage the lawnmower to be self-driven. This pull is provided when the handle 140 is pivoted from its configuration shown in FIG. 7 to that shown in FIG. 8.

As may be seen in FIG. 8, the locking tab 143 extending from the palm bar 142 of the drive actuation handle 140 is positioned underneath the operator presence bar 150 when the drive actuation handle 140 is positioned as shown in FIG. 8. It may be understood that if an operator grips the palm bar against the handle 120, he can not only maintain the lawnmower and self-powered operation, but likewise can also maintain the operator presence control in place. Upon release of the handle 140 (and no other gripping), not only will the lawnmower not only cease being self driven, but it will also cease running or cutting.

Therefore as may be seen, although in the first embodiment shown and described above, hand controls 55 are rotatable about the axis of the spindle 50 to steer the wheels 11 and 12, the hand grips may instead be levers pivotable about a generally vertical axis for transferring motion to the linkage system. Indeed any other suitable linkage or motion transferring system may be employed in keeping with the present invention. In addition and although not shown, it is preferred that the vertical axles 30 of the front wheels 11, 12 be offset forwardly relative to the horizontal axles 11a of the wheels 11, 12 to reduce the amount of force or energy required to steer the wheels 11, 12 particularly over uneven ground or obstacles. Other modifications may become readily apparent to those of ordinary skill in the art but without departing from the scope of the present invention which is indicated in the attached claims to follow.

While this invention has been described in specific detail with reference to the disclosed embodiments, it will be understood that many variations and modifications may be effected within the spirit and scope of the invention as described in the appended claims.

What is claimed is:

1. In a walk-behind lawn mower having a plurality of front and rear wheels for moving the mower over the ground surface, and a handle for operating the mower; steering means for steering the front wheels including a control mounted on the handle and connecting means interconnecting the control and at least one front wheel for turning said one wheel in a horizontal plane about a generally vertical axis upon operation of said control, said steering means including means interconnecting said one front wheel with another front wheel such that movement of said one front wheel is transmitted to the other front wheel, said control including a spindle mounted for rotation on said handle, said connecting means including a linkage system interconnecting said spindle and said one wheel, and said linkage system including a first rod, a first crank connected between said spindle and said rod, a second rod, a second crank connected between said first and second rods, and a third crank connected between said one wheel and said second rod.

2. The lawn mower defined in claim 1 including a third rod connected between said third crank and said other wheel.

3. The lawn mower defined in claim 2 wherein said control includes means for operating a cable for controlling a clutch for a wheel drive included in the mower.

4. The lawn mower defined in claim 1 including an engine mounted on a blade housing for driving a cutting blade and wherein said first crank is mounted to said handle and said second crank is mounted to a support.

5. The lawn mower defined in claim 1 wherein said linkage system further includes a third rod connected between said first crank and said spindle.

6. A walk-behind lawn mower for mowing over a ground surface, comprising:

a mower body including a blade housing:

a handle having an upper end extending from said mower body for pushing said blade housing;

at least one rear wheel operably attached relative to said housing;

at least one steerable front wheel operably attached to said housing; and a linkage system for manually steering said front wheel from the vicinity of said upper end of said handle, said linkage system including a first rod, a second rod, a first crank connected between said first and second rods and pivotably attached relative to said blade housing, and a second crank connected between said front steerable wheel and said second rod, such that said front wheel may be steered by substantially longitudinal manipulation of the upper end of said first rod from the vicinity of the upper end of said handle.

7. The lawn mower as defined in claim 6 including means connecting said front steerable wheel to another steerable front wheel such that both wheels may be steered by manipulation of said first rod.

8. The lawn mower as claimed in claim 7, further comprising means for driving the rear wheel of said mower.

9. A walk-behind lawn mower for mowing over a ground surface, comprising:

a mower body including a blade housing:

a handle having a handle bar having an upper end extending from said mower body for pushing said blade housing;

at least one rear wheel operably attached relative to said housing;

at least one steerable front wheel operably attached to said housing;

a pivot bar pivotably attached relative to said handle, said pivot bar configured to be grasped along with said handle bar by both hands of an operator such that said operator may pivot said pivot bar relative to said handle bar by alternate squeezing of the hands; and a linkage system for manually steering said front wheel by operation of said pivot bar, said linkage system including a first rod pivotably attached to one end of said pivot bar, a second rod, a first crank connected between said first and second rods and pivotably attached relative to said blade housing, and a second crank connected between said front steerable wheel and said second rod, such that said front wheel may be steered by a squeezing action of said pivot bar and said handle bar by said operator.

10. The lawn mower as defined in claim 9 including means connecting said front steerable wheel to another steerable front wheel such that both wheels may be steered by manipulation of said first rod.

11. The lawn mower as claimed in claim 10, further comprising means for selectively locking said pivot bar relative to said handle.

12. The lawn mower as claimed in claim 9, wherein said pivot bar is pivotably attached relative to said handle bar and configured such that a non-opposed squeezing together of said pivot bar and said handle bar by the right hand of said operator causes said steerable front wheel to turn right.

13. The lawn mower as claimed in claim 9, wherein said pivot bar is pivotably attached relative to said handle and configured such that during said squeezing action of said pivot bar and said handle bar, the palms of said operator contact said handle bar and the fingers of said operator contact said pivot bar.

14. The lawn mower as claimed in claim 12, wherein said pivot bar is pivotably attached relative to said handle bar and configured such that during said squeezing action of said pivot bar and said handle bar, the palms of said operator contact said handle bar and the fingers of said operator contact said pivot bar.

* * * * *